(12) United States Patent
Herr et al.

(10) Patent No.: US 11,048,144 B2
(45) Date of Patent: Jun. 29, 2021

(54) LASER SOURCE APPARATUS AND METHOD FOR GENERATING TEMPORAL DISSIPATIVE CAVITY SOLITONS

(71) Applicant: CSEM CENTRE SUISSE D'ELECTRONIQUE ET DE MICROTECHNIQUE SA—RECHERCHE ET DEVELOPPEMENT, Neuchatel (CH)

(72) Inventors: Tobias Herr, Morges (CH); Steve Lecomte, Bernex (CH); Ewelina Obrzud, Geneva (CH)

(73) Assignee: CSEM CENTRE SUISSE D'ELECTRONIQUE ET DE MICROTECHNIQUE SA—RECHERCHE ET DÉVELOPPEMENT, Neuchatel (CH)

( * ) Notice: Subject to any disclaimer, the term of this patent is extended or adjusted under 35 U.S.C. 154(b) by 0 days.

(21) Appl. No.: 16/471,309

(22) PCT Filed: Dec. 19, 2016

(86) PCT No.: PCT/EP2016/002135
§ 371 (c)(1),
(2) Date: Jun. 19, 2019

(87) PCT Pub. No.: WO2018/113893
PCT Pub. Date: Jun. 28, 2018

(65) Prior Publication Data
US 2019/0317379 A1    Oct. 17, 2019

(51) Int. Cl.
*G02F 1/365* (2006.01)
*H01S 3/00* (2006.01)
(Continued)

(52) U.S. Cl.
CPC ............ *G02F 1/365* (2013.01); *H01S 3/0085* (2013.01); *H01S 3/0092* (2013.01);
(Continued)

(58) Field of Classification Search
CPC .......... H01S 3/0085; G02F 1/365; G02F 2/15; G02F 2/17; G02F 2/56
See application file for complete search history.

(56) References Cited

FOREIGN PATENT DOCUMENTS

| WO | WO 2014/131425 | 9/2014 |
| WO | WO2014131425 | * 9/2014 |
| WO | WO 2018/001442 | 1/2018 |

OTHER PUBLICATIONS

Luo, "Resonant radiation in synchronously pumped passive Kerr cavities," Feb. 2015, Optics Letters, vol. 40, No. 3, 427-430. (Year: 2015).*

(Continued)

*Primary Examiner* — Michael Carter
(74) *Attorney, Agent, or Firm* — Ceasar Rivise, PC

(57) ABSTRACT

A laser source apparatus (100) for generating temporal dissipative cavity solitons (1) comprises an input source-device (10), being configured for providing an input light field (2), and an optical resonator device (20) with a resonator (21) having a third order optical Kerr non-linearity and being coupled with the input source device (10) for generating the cavity solitons (1) by the driving input light field (2), wherein the input source device (10) is configured for providing the input light field (2) as a pulse train of laser pulses (3). Preferably, the pulse repetition rate of the input laser pulses (2) is adapted to the free spectral range of the resonator (21) and the carrier envelope offset frequency of the input laser pulses (2) is adapted to one of the resonant (Continued)

frequencies of the resonator (21). Furthermore, a method of generating temporal dissipative cavity solitons (1) is described.

28 Claims, 3 Drawing Sheets

(51) Int. Cl.
    *H01S 3/067*     (2006.01)
    *H01S 3/11*     (2006.01)

(52) U.S. Cl.
    CPC .......... *H01S 3/0675* (2013.01); *H01S 3/1106* (2013.01); *G02F 2203/15* (2013.01); *G02F 2203/17* (2013.01); *G02F 2203/56* (2013.01)

(56) References Cited

OTHER PUBLICATIONS

Xu, "Experimental observation of the spontaneous breaking of the time-reversal symmetry in a synchronously pumped passive Kerr resonator," Jun. 2014, Optics Letters, col. 39, No. 12, 3492-3495. (Year: 2014).*

Herr et al., "Temporal solitons in optical microresonators", NAture Photonics, 8:145-152, 2014.

Jang et al., "Temporal tweezing of light through the trapping and manipulation of temporal cavity solitons", vol. 6, Article No. 7370 (2015).

Jang et al., "Writing and erasing of temporal cavity solitons by direct phase modulation of the cavity driving field", Optics Letters, vol. 40, No. 20, Oct. 15, 2015, pp. 4755-4758.

Lobanow et al., "Harmonization of chaos into a soliton in Kerr frequency combs", Optics Express, vol. 24, No. 24, Nov. 28, 2016, pp. 27382-27394.

Lobanov et al., "Generation of platicons and frequency combs in optical microresonators with normal GVD by modulated pump", EPL—A Letters Journal Exploring the Frontiers of Physics, Dec. 2015, pp. 54008p1-54008p6.

Luo et al., "Resonant radiation in synchronously pumped passive Kerr cavities", Optics Letters, vol. 40, No. 3., Feb. 1, 2015, pp. 427-430.

Malinowski et al., "Synchronously-pumped microring resonator for efficient optical comb generation", 2016 Conference on Lasers and Electro-Optics (CLEO), OSA, Jun. 5, 2016.

Papp et al., "Parametric seeding of a microresonator optical frequency comb", Optics Express, vol. 21, No. 15, Jul. 29, 2013, pp. 7615-17624.

Taheri et al., "Soliton Formation in Whispering-Gallery-Mode Resonators via Input Phase Modulation", IEEE Photonics Journal, vol. 7, No. 2, Apr. 2015, pp. 2200309:1-10.

Xu et al., "Experimental observation of the spontaneous breaking of the time-reversal symmetry in a synchronously pumped passive Kerr resonator", Optics Letter, vol. 39, No. 12, Jun. 15, 2014, pp. 3492-3495.

International Search Report for corresponding PCT Application No. PCT/EP2016/002135 dated Aug. 28, 2017.

* cited by examiner

LASER SOURCE APPARATUS AND METHOD FOR GENERATING TEMPORAL DISSIPATIVE CAVITY SOLITONS

CROSS REFERENCE TO RELATED APPLICATIONS

This application is the U.S. National Phase Application of PCT/EP2016/002135, filed Dec. 19, 2016, the contents of which is incorporated herein by reference in its entirety for all purposes.

FIELD OF THE INVENTION

The present invention relates to a laser source apparatus for generating temporal dissipative cavity solitons, in particular including an optical resonator with a third order optical Kerr non-linearity. Furthermore, the invention relates to a method of generating temporal dissipative cavity solitons. Applications of the invention are available e. g. in optical data transmission techniques, metrology and spectroscopy. In particular, the invention enables micro-photonic pulse compressors, ultra-efficient low noise frequency comb sources and resonant supercontinuum generation for application including optical data transfer, optical spectroscopy, metrology, or optical coherence tomography.

BACKGROUND OF THE INVENTION

In the present specification, reference is made to the following prior art illustrating the technical background of the invention:

[1] T. Herr et al. in "Nat. Photonics" 8:145-152, 2014;
[2] WO 2014/131425 A1;
[3] J. K. Jang et al. in "Optics Letters" 40:4755, 2015;
[4] J. K. Jang et al. in "NATURE COMMUNICATIONS" 6:7370, 2015;
[5] V. E. Lobanov et al. in "Optics Letters" 24:27382, 2016;
[6] H. Taheri et al. in "IEEE Photonics Journal" 7:2200309, 2015;
[7] S. B. Papp et al. in "OPTICS EXPRESS" 21:017615, 2013;
[8] V. E. Lobanov et al. in "EPL" 112:54008, 2015; and
[9] PCT/EP2016/001102 (not published on the priority date of the present application).

It is generally known that continuous-wave (cw) laser driven nonlinear, high-Q optical micro-resonators have enabled a variety of novel applications and phenomena including the generation of optical frequency combs, ultra-low noise microwaves, as well as, ultra-short optical pulses. Driven by a cw input laser, optical micro-resonators give rise to efficient parametric frequency conversion, and stimulated Brillouin and Raman scattering. The nonlinear optical effects in micro-resonators have enabled the generation of frequency combs with tens of Gigahertz mode spacing and have found application in coherent optical data transfer, arbitrary optical waveform generation, as well as ultra-low noise electronic signal generation.

Of particular importance is the generation of temporal dissipative Kerr-cavity solitons (DKS) (e. g. [1], [2]), i. e. pulses of light that, driven by the input laser, propagate indefinitely and without changing their shape inside the resonator. Such DKS provide a reliable way of achieving a smooth spectral envelope and low noise frequency combs. Owing to these properties, such soliton frequency combs have for instance enabled chip-scale dual comb spectrometers, 50 Tbit/s optical data transmission, broadband low noise comb generation for self-referencing and low noise microwave signal generators.

Vital for the existence of bright DKS is the optical nonlinearity and the material's anomalous group velocity dispersion (GVD) in the micro-resonator that, by balancing each other, prevent temporal spreading of the soliton. In addition the inevitable resonator losses are compensated by the cw driving input laser (or: holding beam) that via the Kerr-nonlinear parametric gain constantly provides power to the soliton. It has been shown that in fiber-ring cavities phase modulation of the cw holding beam on time scales much faster than the resonator roundtrip time can be used for 'writing' and 'erasing' of DKS at arbitrary times inside the cavity [3] and for trapping solitons into specific (copropagating) timeslots [4].

Fiber-ring cavity related methods are not directly applicable to micro-resonators, wherein the resonator roundtrip time is much faster and the soliton pulse duration much shorter in comparison to fiber-ring cavities. Indeed, the generation of DKS in micro-resonator is to date challenging. First, a rapid and precise control (comparable or faster to the thermal time constant) of the relative cw laser to resonator detuning is required in order to achieve stable soliton operation ([1], [2]). Second, due to the spontaneous formation of the DKS from an uncontrollable breathing soliton state (e. g. [1]), the number as well as the relative separation in time between solitons is random and cannot deterministically be controlled.

While to date operation of nonlinear micro-resonators does generally rely on a cw driving laser, it has been shown that phase and amplitude modulation of the cw laser can in parts overcome the challenges associated with the formation of DKS ([5], [6]). These approaches are similar to experimental demonstrations where parametric seeding was used to control the dynamics of four-wave mixing [7] or the generation of 'platicons' in the normal dispersion regime [8] via intensity modulation of the continuous wave laser. In all cases however, a continuous wave driving beam remains an integral component of the system.

Presently, the known approaches for generating temporal dissipative cavity solitons have the following disadvantages limiting the practical application of soliton sources.

Firstly, the efficiency of DKS generation is limited by the fact that the continuous wave driving input results in a high average pump power, while the output DKS with fs duration have a relatively lower average power (often 100 times less than the input average power). The limited efficiency causes disadvantages in terms of energy consumption and load to optical components by the holding beam.

Secondly, the repetition rate of the generated DKS is determined by the round trip length in the micro-resonator. As the micro-resonator size can fluctuate, e. g. due to thermal drifts, the DKS repetition rate and further DKS parameters can fluctuate as well. This can cause restrictions e. g. for data transmission or spectroscopy applications. In order to provide a stable DKS generation, in particular repetition rate, the known setups for DKS generation require complex measures for thermally or mechanically stabilizing the micro-resonator.

Thirdly, in continuous-wave driven systems rapidly tunable lasers (both in intensity and wavelength) or rapid actuation of the resonator is required for limiting and controlling the effects (such as shifts of resonance frequencies) of laser induced heating.

OBJECTIVE OF THE INVENTION

It is an objective of the invention to provide an improved laser source apparatus for generating temporal dissipative cavity solitons, being capable of avoiding disadvantages of conventional techniques. In particular, the laser source apparatus is to be capable of DKS generation with increased efficiency, reduced required input pump power, improved controllability and/or improved stability, e. g. stabilized repetition rate. Furthermore, it is an objective of the invention to provide an improved method for generating temporal dissipative cavity solitons, being capable of avoiding disadvantages of conventional techniques, in particular in terms of efficiency, input pump power and operational stability.

BRIEF SUMMARY OF THE INVENTION

These objectives are solved by a laser source apparatus and/or a method for generating temporal dissipative cavity solitons as defined in the independent claims. Advantageous embodiments and applications of the invention are defined in the dependent claims.

According to a first general aspect of the invention, the above objective is solved by a laser source apparatus for generating temporal dissipative cavity solitons (or: DKS source apparatus), comprising an input source device for providing an input light field and an optical resonator device including a resonator, in particular a micro-resonator. The input source device and the optical resonator device are arranged for coupling of the input light field into the resonator. The resonator is made of a material, which has a third order optical Kerr non-linearity, and the resonator is configured for generating the cavity solitons by the driving input light field, in particular by an optical non-linear interaction of the input light field with the resonator material. According to the invention, the input source device is configured for providing the input light field as a pulse train of laser pulses.

According to a second general aspect of the invention, the above objective is solved by a method of generating temporal dissipative cavity solitons (or: DKS generating method), comprising steps of coupling an input light field into a resonator having a third order optical Kerr non-linearity and generating the cavity solitons in the resonator by the effect of the driving input light field. According to the invention, the input light field is a pulse train of laser pulses. Preferably, the method is conducted using the laser source apparatus of the invention.

Contrary to the conventional continuous-wave optical input drive, the inventive DKS generation is based on the input light field which is formed as a periodic pulse train of laser pulses, i. e. a sequence of laser pulses being temporally separated from each other by a finite interval. The pulse train of laser pulses is a non-sinusoidal waveform, in particular with zero background or negligible background between the laser pulses. The inventors have found that DKS generation is possible even if the input light field has an effective amplitude for pumping the resonator only at certain times when it is required for driving a circulating soliton in the resonator. With the pulse train shaped input light field, the DKS generation can be started and continued with high temporal stability.

The inventors break with the paradigm of the continuous-wave optical drive, and instead use periodic, e. g. picosecond optical pulses. The deterministic generation of single or multiple stable, e.g. femto-second, dissipative Kerr-soliton 'on-top' of the resonantly enhanced driving pulse is observed.

Due to the decreased average power of the input light field (compared with a cw input laser with same maximum amplitude), the efficiency of the DKS generation has been essentially improved. When compared to both, known continuous-wave driven micro-resonators or non-resonant pulsed supercontinuum generation the invention is drastically more efficient and can already give rise to broadband frequency combs at femto-Joule driving pulse energies, and average pump powers significantly below parametric threshold power of continuous-wave driven micro-resonators. The invention bridges and unifies the fields of continuous-wave driven resonant and pulse-driven non-resonant nonlinear optics.

As a further advantage and particularly surprising result of the inventors, the soliton pulse locks to the driving pulse, which enables direct and high-bandwidth all-optical control of both the soliton pulse repetition rate and soliton carrier envelope offset frequency without the need for any actuation on the resonator. The soliton generation follows the input laser pulses. The repetition rate of the solitons can be controlled by controlling the repetition rate (reciprocal period of the pulse train) of the input pulses. Thus, DKS generation can be stabilized without thermal or mechanical stabilization of the resonator.

Contrary to [5], which discloses a cw input beam with sine-shaped variation of the amplitude, the inventive apparatus is operated with laser pulses being separated from each other and each having a plurality (preferably more than 3 optical modes, in particular at least 10 optical modes). With the technique of [5], neither a potential of improving the efficiency nor the optical control of the solitons have been recognized.

The pulse train of laser pulses has a duty cycle defined by the pulse duration of the laser pulses divided by the pulse repetition period. Generally, the input source device is configured for generating the pulse train of laser pulses with a duty cycle below ½. According to a preferred embodiment of the invention, the duty cycle is equal to or below ⅕, in particular equal to or below 1/10. Below these limits, the improvements of efficiency, deterministic single soliton generation and stabilization have particular impact for the application of the invention in practice.

According to a further important advantage of the invention, the number of solitons circulating in the resonator can be determined by controlling the pulse duration of the input laser pulses. According to a first variant, the input source device is controllable in pulse duration such that only one single cavity soliton is created per input laser pulse. In this case, the pulse duration preferably is below 3 ps. According to a further variant, the input source device is controllable in pulse duration such that two or more cavity solitons are created per input laser pulse. This is preferably obtained, if the pulse duration is at least 4 ps and below 10 ps.

According to a further preferred embodiment of the invention, the laser source apparatus includes a sensor device for sensing parameters of at least one of the input light field and the cavity solitons. The sensor device has particular advantages for monitoring the state of soliton generation (validating the soliton state) and/or providing an optional control loop (see below) for controlling the input source device. Detecting the soliton state can be done once at the beginning of resonator operation, repeatedly for monitoring the resonator state and/or continuously for feedback-controlling the laser source apparatus.

Sensing pulse parameters of the input light field, like pulse duration, centre wavelength, average power, carrier envelope offset frequency and/or repetition rate, can be done with any available sensor element, like a photo diode, an optical spectrum analyzer, a wavemeter or a sensor camera, receiving a portion of the input light field, preferably before coupling into the resonator. Alternatively, a portion of the input light field transmitted through the resonator can be sensed. Accordingly, sensing parameters of the solitons, like number of solitons, soliton duration, centre wavelength, average power and/or repetition frequency, can be done in reflection and/or transmission at the resonator, i. e. at the input and/or at the output side of the resonator.

In particular the soliton state can be detected by a transmission measurement, or, in refection sensing light loss compared with the input light field, e. g. with a photo diode. The transmitted light or the light loss measured in reflection are a direct measure for the occurrence of the solitons. Preferably, the soliton state is detected when the resonator transmission as a function of input pulse carrier envelope offset frequency (or detuning of the modes of the optical input spectrum from the resonance frequencies) shows a series of regular step features. Alternatively or additionally, a light modulation can be sensed by a frequency analysis of the sensor element signal, an optical spectrum of the light coupled out of the resonator can be measured, and/or a standard pulse measurement, e. g. based on an auto-correlation measurement can be done.

According to a particularly preferred embodiment of the invention, the input source device is adapted for a control of the pulse repetition rate and the carrier envelope offset frequency of the input laser pulses. These pulse parameters are adapted to resonator parameters. In particular, the pulse parameters are controlled such that the optical modes of the laser pulses are adapted to resonant modes of the resonator. Alternatively or additionally, the resonator is controllable in resonance frequencies, such that the optical modes of the laser pulses are adapted to resonant modes of the resonator. The resonator is controllable by an actuator, including e. g. a temperature control, a mechanical stress control and/or an electro-optic tuning of the resonator, as a means to adapt the free spectral range of the resonator to a provided pulse repetition rate of the input source.

With further details, the pulse repetition rate of the input laser pulses and the free spectral range (FSR) (and reciprocal round trip time of the soliton to be obtained) of the resonator (or an integer fraction or an integer multiple thereof, see below) are adapted relative to each other, and the carrier envelope offset frequency of the input laser pulses and the resonance frequency of the resonator are adapted relative to each other. The term "adapting" covers both of equal or approximately equal (deviation typically below one effective resonance width of the resonator) amounts of the respective pulse and resonator parameters. As an example, with a repetition rate of 10 GHz, a resonance width of 5 MHz, a mismatch with the FSR of the resonator of 100 kHz can be tolerated.

Preferably, creating the DKS is obtained by firstly adapting the pulse repetition rate to the free-spectral range of the resonator generally, then scanning the carrier envelope offset frequency of the pulse train such that the optical modes of the pulse train scan over the resonance frequencies with decreasing optical frequency (increasing optical wavelength), and stopping tuning of the pulse train's carrier envelope offset frequency once the soliton state has been achieved.

The tolerance in adapting the pulse parameters and the resonator parameters to be obtained represents an essential advantage of the invention. Considering for example an input pulse duration of 1 ps, and an input pulse repetition rate of 10 GHz, based on the conventional techniques where the input pulse would act as a local CW background, it was expected that the soliton and the driving pulse would drift apart (resulting in annihilation of the soliton) within less than 10 ms if the driving pulse repetition rate differs only by 1 Hz from the soliton's natural pulse repetition rate, which is largely defined by the FSR of the resonator. Stabilizing the resonator's FSR to the 1 Hz level would amongst other aspects imply a temperature stability of less than 10 µK, despite the effect of comparably strong laser heating. Before the invention, this was considered to be practically impossible. However, as mentioned above, the soliton pulse locks to the driving pulse, and the inventors have found that DKS are capable of adapting their round trip time to the repetition rate of the input pulses in the resonator by self organization effects.

Depending on the application of the invention, it is possible that the input pulse repetition rate is matched not to the single FSR of the resonator, but to an integer fraction or an integer multiple of the FSR of the resonator. Accordingly, only every n-th input pulses is used for driving the DKS, or the DKS are driven every n-th round trip only (n: integer, e. g. up to 100 or even more. In these cases, there is still the synchronization of input pulses and DKS. While driving the resonator at an integer fraction or multiple of its FSR reduces the efficiency when compared to driving it at its FSR, this approach is nevertheless interesting as the high peak power obtainable with standard mode locked lasers (operating at a pulse repetition rate e.g. at an integer fraction of the resonator's FSR) can outweigh this efficiency reduction.

Preferably, the laser source apparatus includes a control unit including an input control device and/or a resonator control device. The input control device is adapted for controlling at least one of the pulse repetition rate and the carrier envelope offset frequency of the input source device. With the input control device, the input source device can be adjusted in a targeted manner. Optionally, the input control device can be provided for controlling further input pulse parameters, like pulse duration, centre wavelength, and/or average power and/or operational conditions of the input source device. The resonator control device is adapted for acting on the resonator, so that resonance frequencies of the resonator are adapted to at least one of the pulse repetition rate and the carrier envelope offset frequency of the input source device.

With a further preferred implementation of the invention, a feedback control loop including the sensor device and at least one of the input control device and the resonator control device is implemented. The input control device and/or the resonator control device are configured for acting on the input source device and/or the resonator, resp., in dependency on the sensed parameters. Advantageously, the optional control loop allows an automatic stabilization of the DKS generation.

As a further advantage, the input source device can include any laser pulse source allowing an adjustment and preferably a control of the repetition rate and the carrier envelope offset frequency of the input pulses. To this end, the input source device preferably is a tunable electro-optic modulator-based pulse generator, a mode-locked laser, an amplitude modulated cw laser source or a phase-modulated cw laser source which can be implemented in conjunction with a dispersive element for pulse compression.

With a further example, the input source device may comprise a laser source apparatus according to the invention. Accordingly, a serial cascade arrangement of multiple (at least two) laser source apparatuses can be provided, wherein one of the laser source apparatuses is arranged as the input source device of a subsequent one of the laser source apparatuses. Advantageously, each laser source device works as a pulse compressor, so that the serial cascade arrangement of laser source apparatuses provides an additional soliton shortening.

Preferably, the input source device has at least one of the following features. The input source device provides the pulse train of laser input pulses preferably with a duration from 10 fs to 100 ps, with a repetition rate from 10 MHz to 100 GHz, in particular from 10 GHz to 100 GHz, and/or with a frequency chirp. Input pulses with a duration below 100 ps, in particular below 10 ps, e. g. 1 ps, have particular advantages in providing high peak power for driving the soliton generation, resulting in a shortening of the DKS. Providing the frequency chirp, e. g. by modulating the phase of the input pulses, has particular advantages in terms of providing another degree of freedom for controlling the DKS generation.

As a further advantage of the invention, multiple variants exist for selecting a type of resonator, in particular in dependency on the requirements of an application of the invention. With preferred examples, the resonator includes a Fabry-Perot cavity, a ferrule contained coated optical fiber, in particular single mode optical fiber (as described in [9]), and/or a waveguide. Furthermore, the resonator can be made of SiN, AlN, $SiO_2$ or chalcogenide glass or a crystalline optical material, in particular $CaF_2$ or $MgF_2$ or $BaF_2$ or diamond or $LiNbO_3$ or $KNbO_3$ or silicon or gallium arsenide or indium phosphide.

According to particularly preferred applications of the invention, the resonator comprises an optical micro-resonator. The micro-resonator is a resonator having sub-cm scale optical path length, e. g. between resonator mirrors in a linear resonator or along one circulation on a circular resonator (e. g. optical path length equal to or below 1 cm) and/or micro-meter scale optical mode field diameter (e. g. optical mode field diameter equal to or below 100 μm).

In summary, the invention provides the following advantages:
- the DKS can be generated with femtosecond pulse duration;
- the precise control of the soliton pulse repetition rate and carrier envelope offset frequency via the input pulse train allows for all optical stabilization, wherein this solves a challenge encountered in known continuous wave driven systems;
- the input pulse train allows to deterministically generate only one or more than one soliton in the resonator, wherein this solves the problem of statistical DKS generation in continuous-wave driven systems;
- the required input pump power is reduced significantly when compared to continuous-wave laser driven resonators (approximately reduced by a factor that corresponds to the duty cycle of the optical pulses);
- the reduced required input pump power (when compared to a continuous-wave driven system) results in reduced laser induced heating; and
- the resonator can be driven by ultra-short picosecond or femtosecond pulses.

BRIEF DESCRIPTION OF THE DRAWINGS

Further advantages and details of the invention are described in the following with reference to the attached drawings, which show in.

PREFERRED EMBODIMENTS OF THE INVENTION

Embodiments of the invention are described in the following with exemplary reference to a laser source device including an electro-optic modulator (EOM)-based input source device and a linear micro-resonator embedded in a ferrule. With regard to the features of this type of micro-resonator, citation [9] is introduced to the present specification by reference. It is emphasized that the invention is not restricted to these examples, but rather can be implemented with other types of input source device and resonators (e. g. as mentioned above). In particular, the resonator geometry of the micro-resonator embedded in a ferrule, is formally equivalent to ring-type micro-resonators.

The drawings show schematic views of the optical components for illustrative purposes, wherein the details of the optical components can be implemented as it is known as such in the art. Details of operating the laser source device, like e. g.

operating the input source device or coupling light into or out of the resonator can be provided as known in the art.

Figure 1:
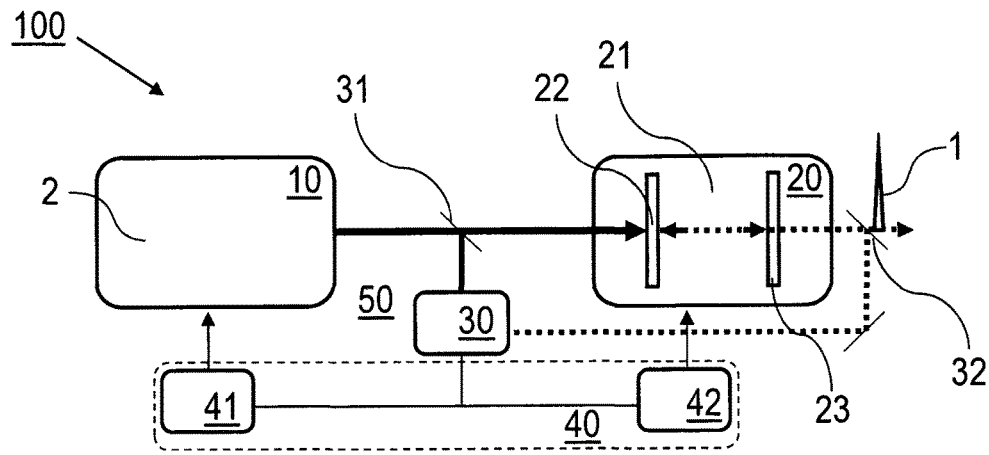
FIG. 1: a schematic illustration of features of a laser source device according to preferred embodiments of the invention.

FIG. 1 shows an overview of a laser source apparatus 100 for generating solitons 1 with the input source device 10 and the optical resonator device 20 including an optical micro-resonator 21. The input source device 10 which is described with further details with reference to FIG. 3 below, creates the input light field 2 comprising a pulse train (sequence) of laser pulses. The micro-resonator 21 has an incoupling resonator mirror 22 and an outcoupling resonator mirror 23, being adapted for incoupling the input light field 2 and outcoupling the solitons 1 (possibly with a portion of the transmitted input light field 2) for a subsequent application.

A portion of the input light field 2 is directed via a beam splitter 31 to a sensor device 30 comprising e. g. a photo diode. Alternatively, the beam splitter 31 can be arranged for directing a portion of light reflected by the incoupling resonator mirror 22 of the resonator 21 and/or another beam splitter 32 can be arranged for directing a portion of light transmitted through the resonator 21 to the sensor device 30.

A control unit 40 is provided including an input control device 41 and/or a resonator control device 42. The components can be provided separately or combined in the common unit 40 as shown with dashed line. The input source device 10 is controllable with the input control device 41. The input control device 41 is configured in dependency on the type of input source device 10 and input pulse parameters to be controlled. As an example, in a mode-locked laser the repetition rate can be controlled via changing the cavity length. The carrier envelope offset frequency can be controlled via the current of a pump diode of an optically pumped pulsed laser.

The resonator control device 42 is provided for acting on the resonator in order to adapt resonance frequencies, in particular the FSR and/or an offset tuning, to the repetition rate and/or the carrier envelope offset frequency of the input pulse train. The resonator control device 42 includes e. g. a temperature control, a mechanical actor or an electro-optic tuning element.

Optionally, the sensor device 30 can be coupled with the control unit 40 for providing a control loop 50 for feedback controlling the input source device 10 and/or the resonator device 20, in particular the pulse repetition rate and the carrier envelope offset frequency and/or the resonance frequencies in dependency on the sensed parameters of the input laser field 2 and/or the solitons 1.

Figure 2:
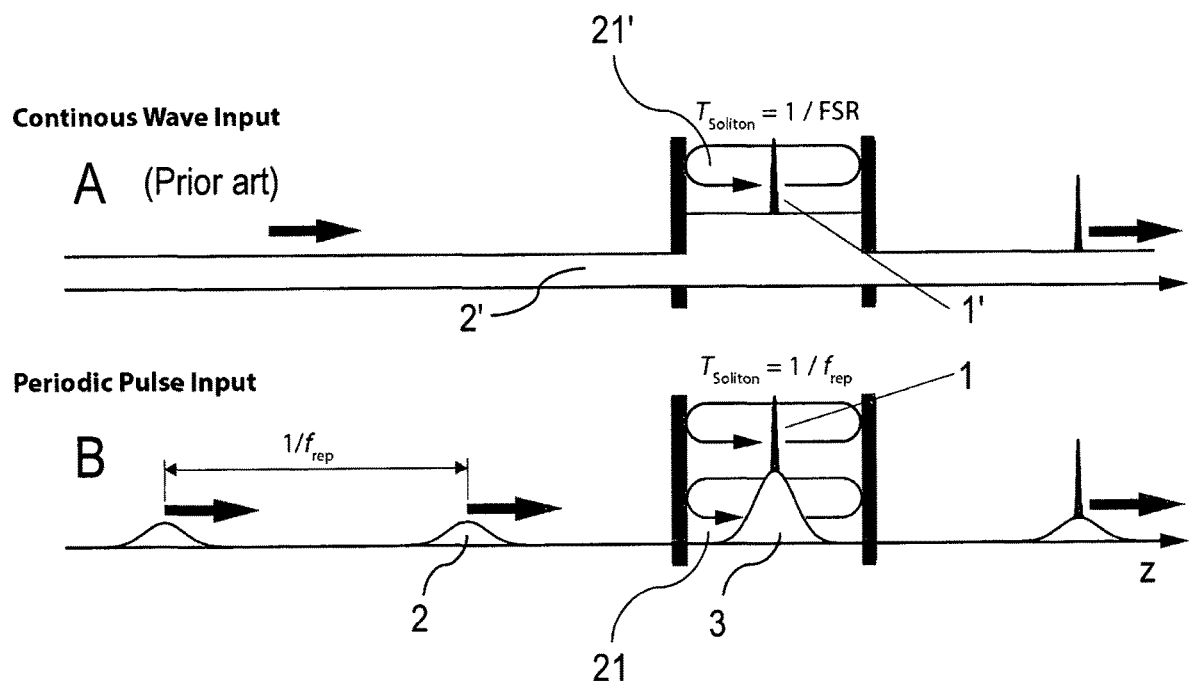
FIG. 2: a schematic comparison of the conventional technique with a cw input beam and the inventive technique with a pulsed input beam.

FIG. 2 shows a comparison of the known cw input based DKS generation (FIG. 2A, prior art) and the inventive pulse input based DKS generation (FIG. 2B) along a spatial coordinate z. FIG. 2A shows a cw driven micro-resonator 21'. A temporal dissipative soliton 1' can form inside the micro-resonator 21' and propagate with a roundtrip defined by the resonator's inverse free-spectral range (FSR) while being supported by the resonantly enhanced cw background of the input light field 2'. According to FIG. 2B, periodic pulses of the input light field 2 are resonantly built up in the resonator 21, while their corresponding optical modes match the resonant frequencies of the resonator 21. Solitons 1 can form if the inverse driving pulse repetition rate $1/f_{rep}$ and the soliton roundtrip time match within a certain tolerance interval.

FIG. 2 illustrates how the invention deviates from the concept of a continuous wave driving beam conventionally used for micro-resonators. According to the invention, the resonantly enhanced pulsed driving of the micro-resonator 21 is used for nonlinear optics and in particular the generation of DKS. This does not only correspond to a novel scheme of resonant supercontinuum generation, but could also allow for unprecedentedly efficient micro-resonator based ultra-short soliton pulse and frequency comb generation. In this configuration, the periodic train of driving pulses 2 replaces the cw holding beam (FIG. 2A), so that inside the resonator cavity a resonantly enhanced pulse 3 co-propagates with the soliton pulse (FIG. 2B).

Figure 3:
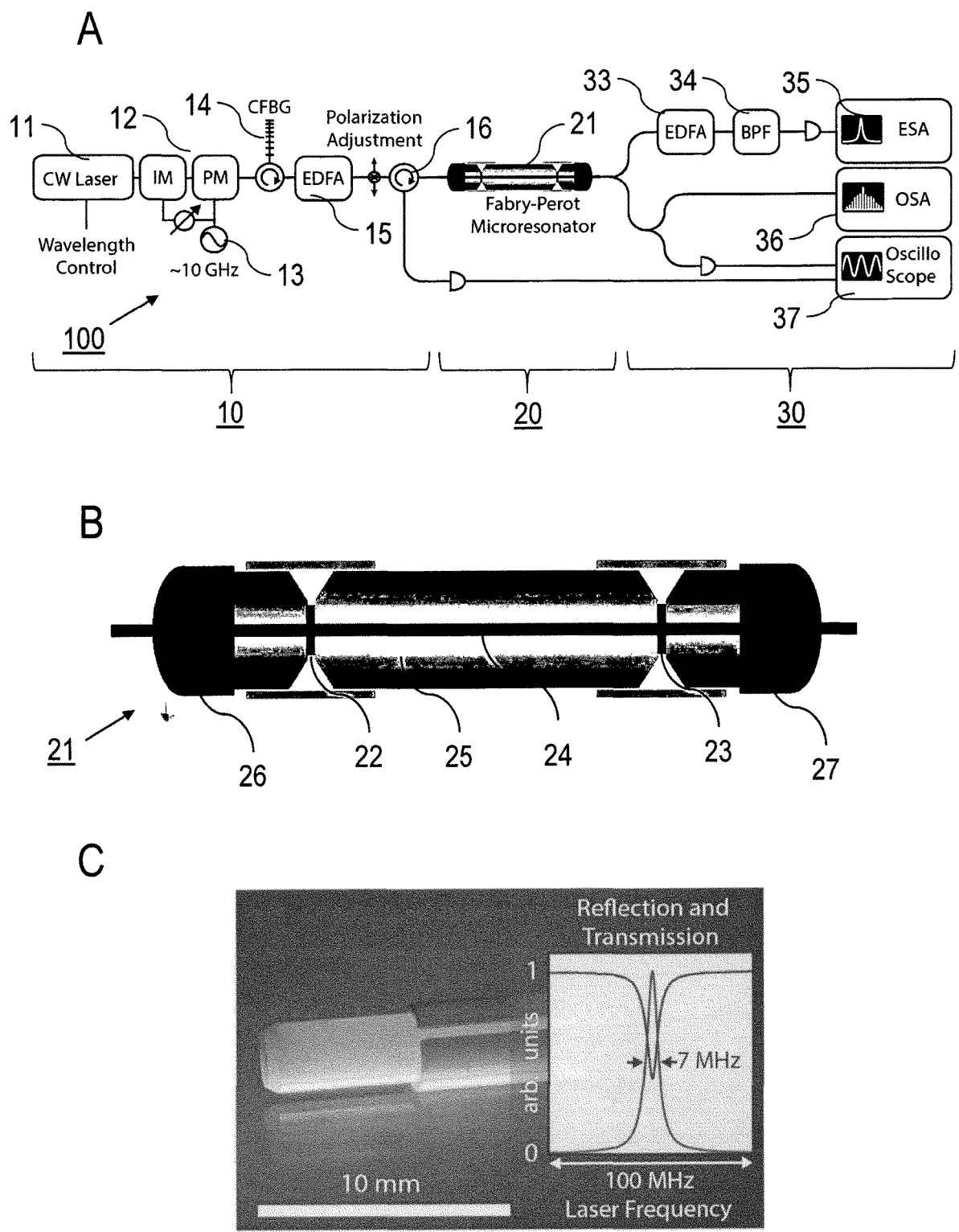
FIG. 3: illustrations of detailed features of a laser source device according to a further embodiment of the invention.

FIG. 3 shows further details of a practical example of a laser source device 100 according to the invention. The optical setup (FIG. 3A) comprises the input source device 10, the resonator device 20 and a sensor device 30 (shown here for diagnostic purposes).

The input source device 10 is provided by a pico-second periodic laser pulse generator (here: based on electro-optic intensity and phase modulators (IM/PM) 12. A 1559 nm cw fiber laser 11 is strongly chirped using the EOM phase modulator 12 (driven by a tunable 9.77 GHz microwave source 13) and compressed into picosecond pulses via linear propagation in a chirped fiber-Bragg grating 14 for chirp compensation. The pulse repetition rate corresponds to the modulation frequency. For pulse compression a chirped fiber-Bragg grating 14 with a group delay dispersion (GDD) of 10 ps/nm is used. The exact GDD value however is not critical and adding 100 m of SMF in addition to the CFBG 14 does not alter the results presented below significantly.

Prior to phase modulation, an intensity modulator (IM) is used to carve out the modulation half period with the correct sign of chirp. Such EOM based pulse generator 12 allows for straightforward control of both, pulse repetition rate and pulse center wavelength (i.e. carrier envelope offset frequency). After chirp compensation in the CFBG 14, the pulses have a pulse duration of 2.4 ps and are characterized by an almost flat-top spectrum. Next, the pulses are amplified in an erbium-doped fiber amplifier 15 up to 1.5 W of average power. Prior to being coupled to the resonator device 20, the amplified pulses propagate through approximately 10 m of optical fiber resulting in moderate pulse shortening to 2.1 ps and formation of weak side pulses (peak power 13% of main pulse, separation from main pulse about 2 ps). This manifests itself in the generation of additional spectral lines. With this setup, effectively about 30 to 50 optical modes (lines) are generated (corresponding to the pulse duty cycle) of approximately equal optical power, that are equally spaced in optical frequency by the modulation frequency. The threshold power reduction when compared to cw driving is in the same order.

The resonator device 20 includes an optical fiber-based Fabry-Perot microresonator 21 as shown in FIG. 3B and further illustrated with a photographic image in FIG. 3C (see also [9]). The inset of FIG. 3C shows the measured reflection and transmission of the resonator 21 when scanning across the resonance frequency with a cw laser. The microresonator 21 consist of a mm-scale length optical fiber 24 with a total lengths of about 10 mm whose end facets have been coated with highly, reflecting, zero group delay dielectric Bragg-mirror coatings providing incoupling and outcoupling mirrors 22, 23. The resonator 21 has a FSR of 9.77 GHz, resonance width of 7 MHz and a linear coupling efficiency of 60%. While the Bragg-mirror would in principle allow for engineering of the resonator's group-velocity dispersion (GVD) e.g. for operation in the visible wavelength regime, this is not required in the present case, where the optical fiber already naturally provides an anomalous GVD of $\beta_2 = -20$ $ps^2/km$ (at the driving center wavelength of 1559 nm) as required for the principal existence of solitons. The Kerr-nonlinearity and the effective mode area of the optical fused silica fiber 24 are $n_2 = 0.9 \times 10^{-20}$ $m^2 W^{-1}$ and $A_{eff} = 85$ $\mu m^2$. This resonator design allows for a high-Q microresonator with a FSR low enough to be matched by the available driving laser source. For reasons of mechanical robustness and straightforward interfacing with optical fiber the resonator fiber 24 is mounted inside a fiber optic ferrule 25 whose diameter matches the one of standard FC/PC fiber connectors. As opposed to travelling wave resonators that require a bus waveguide, prism or a tapered optical fiber for coupling, the present system is inherently fiber coupled using an input fiber coupler 26 and an output fiber coupler 27 (FIG. 3B).

The sensor device 30 is coupled with the output fiber coupler 27 of the laser source apparatus 100. In the illustrated example, the sensor device 30 includes an erbium doped fiber amplifier 33 (EDFA) and a bandpass filter 34 (BPF) coupled with an electronic spectrum analyzer 35, an optical spectrum analyzer 36 and an oscilloscope 37. The transmitted spectrum of the resonator 21 measured with the sensor device 30 gives direct access to the intra-cavity soliton 1 field and is equivalent to a drop port that efficiently suppresses uncoupled input light 2 during soliton operation. Note, that the illustrated components of the sensor device 30 only serve a complete characterization of the generated DKS. In practical applications, the sensor device 30 comprises simple components, like at least one photo diode, optionally coupled with an electronic spectrum analyzer (see e. g. FIG. 1).

In the following, test results are described, obtained with the laser source device 100 according to the invention. The test results refer to the practical indication of soliton formation via pulsed driving, the characterization of the solitons, and investigating the of DKS generation.

Practical indication of soliton formation is obtained by precisely matching first the central wavelength of the input source device 10 (wavelength defined by the cw fiber laser 11, see FIG. 3) to a resonance of the resonator 21 and second the pulse repetition rate (defined by the modulation frequency) to the resonator's FSR. The pulse duration is 2.1 ps and the maximally coupled driving power approximately 100 mW. The regime of soliton formation is identified by repeatedly scanning the cw fiber lasers 11 wavelength across a resonance (from blue to red detuning) while at the same time slowly decreasing the microwave modulation frequency of the microwave source 13 around the value of the FSR of 9.77 GHz. The soliton formation is found, when the resonator transmission, that is the cumulative resonance shape of all driven modes, shows characteristic step features that are in marked similarity to the ones observed in known cw driven systems where they are directly related to formation of DKS [1]. In contrast to known cw driven systems, the observed transmission is essentially free of the random fluctuation of step length and height in the transmission spectrum. Strikingly, the step feature appears for a rather wide, 100 kHz spanning interval of driving pulse repetition rates, suggesting that DKS formation in a pulsed system is unexpectedly robust against a mismatch between FSR and pulse repetition rate.

Figure 4:
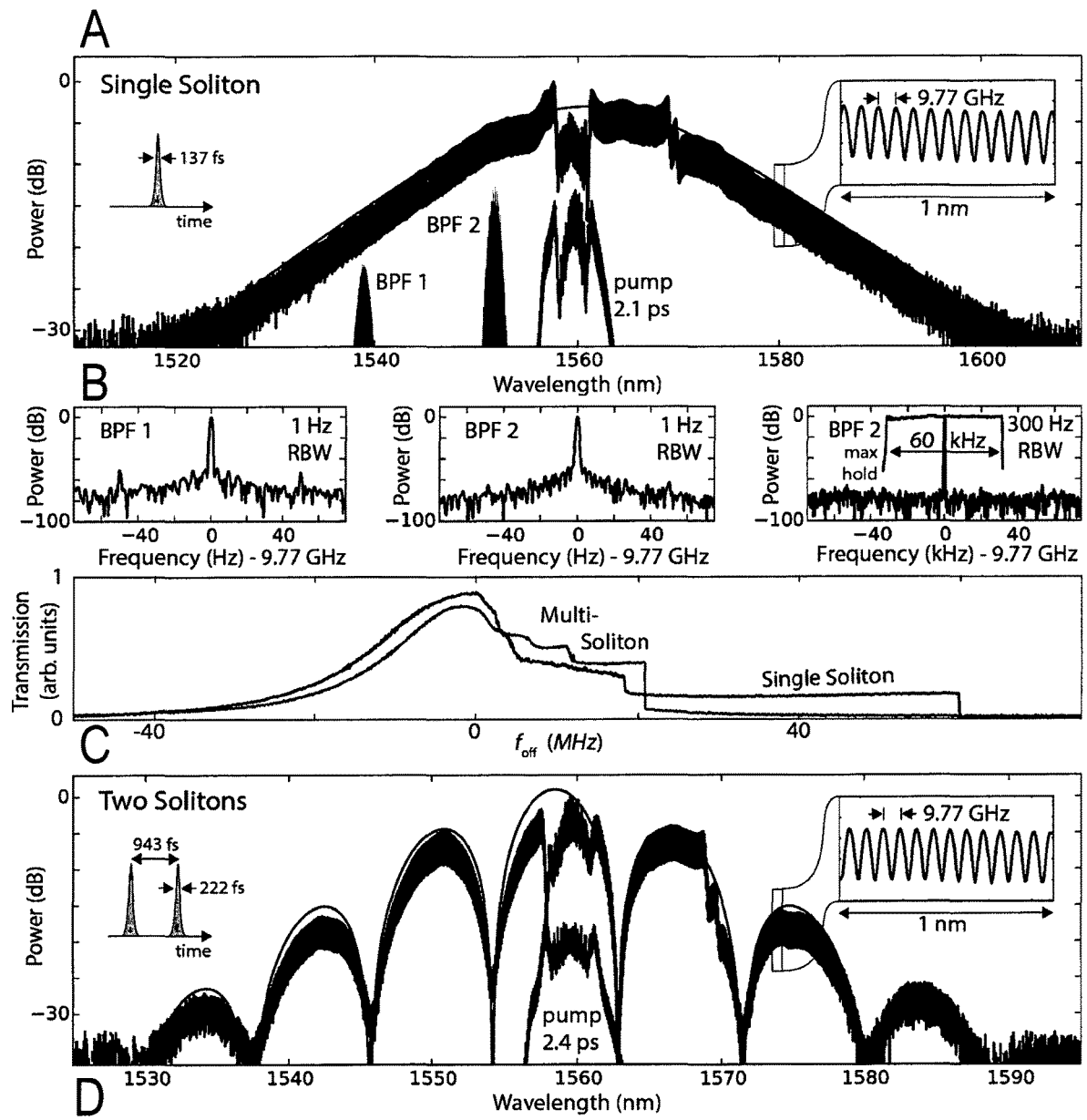
FIG. 4: further illustrations of DKS generation using pulsed input beams.

FIG. 4 includes further tests results characterizing the solitons generated according to the invention. FIG. 4A shows an optical spectrum of a single soliton obtained when driving with 2.1 ps pulses and a coupled power of maximally 100 mW. With a sech2-fit, a soliton pulse duration of 137 fs is found (see insert). The input pulse spectrum is indicated in the center, the additional spectra at shorter wavelength indicate the transmission spectra of bandpass filters (see e. g. BPF 34 FIG. 3A) used for intermode beatnote detection. FIG. 4A shows intermode beatnotes recorded using BPFs in the setup shown in FIG. 3A (left/middle) and the adiabatic change of the soliton mode spacing by varying the external pulse repetition rate $f_{rep}$ within an interval of 60 kHz (upper curve is the max-hold trace of the beatnote signal) without losing the soliton state (right). FIG. 4C shows a comparison of single and multiple (two) solitons transmission curves, and FIG. 4AD shows the optical spectrum of two solitons obtained when driving with 2.4 ps pulses.

With further details, FIG. 4A shows the optical spectrum of DKS obtained after tuning the driving modes into the step-feature. This spectrum corresponds to single soliton pulse of 137 fs duration circulating stably in the resonator 21 with a pulse repetition rate of 9.77 GHz. For a maximally coupled pump power of 100 mW and driving pulse duration of 2.1 ps this frequency comb spectrum (line spacing 9.77 GHz) consists of more than 1000 individual spectral lines (within 25 dB) and its envelope follows closely the characteristic sech2 shape. A particular advantage and distinct when compared to known cw driven systems is that there is no strong individual spectral component being orders of magnitude stronger than the soliton spectrum.

Two spectral features deviate from its ideal shape: First, around 1570 nm an 'up-down' feature, characteristic for avoided mode crossings is visible. While the intrinsically single mode resonator drastically reduces the number of mode crossings (when compared to e.g. crystalline microresonators), the two polarization mode-families (non-degenerate due to stress induced birefringence) can weakly couple via linear scattering at the resonator facets. This coupling can give rise to avoided mode crossings. The second spectral feature, are the spectral 'ears' adjacent to the central portion of the driving laser spectrum. Those 'ears' are already present in the driving laser spectrum prior to its coupling to the resonator 21 and are due to the Kerr-nonlinearity of the optical fiber that is used to transport the pulsed light from the EDFA 15 to the resonator 21 (see FIG. 3A). Only the central portion of the spectrum effectively contributes (as can be seen from the reduction of this part of the pump spectrum in the soliton spectrum) to driving the soliton. The 'spectral ears' give rise to weak power side pulses. This effect could be considered as reducing the efficiency of the driving input source device 10. Note, however, that this could be avoided by optimizing the transportation of the amplified pulses to the resonator 21.

The inventive DKS generation driven by pulses without a cw holding beam is a surprising result found by the inventors, when the soliton co-propagates in sync with the driving laser input pulses 2 inside the resonator 1. In order to demonstrate and investigate the quality of this new nonlinear optical locking mechanism, the microwave beatnote generated by the repetitive, out-coupled soliton pulses is recorded and compared to the 9.77 GHz microwave signal that is used to drive the EOMs 12 of the input source device 10 (defining the driving pulse repetition rate). In order to only detect the actual soliton pulse and not the driving pulse, the beatnote detection is limited, via an optical bandpass filter, to spectral component of the soliton that do not overlap with the spectral content of the driving pulse (FIG. 4A). Prior to filtering, the soliton spectrum is amplified via a low power EDFA 33 (FIG. 3A) in order to reach a higher signal to noise ratio. The resulting beatnotes are shown in FIG. 4B (left, middle). These beatnotes precisely correspond to the repetition rate of the driving laser, are perfectly stable and show 1 Hz resolution bandwidth limited signals, without any sidebands or sign of noise anywhere from DC to the carrier frequency. This, demonstrates the tight locking characteristics of the soliton to the driving pulse.

Next, the robustness of this locking under small variation of the driving laser's input pulse repetition rate (i.e. variation of the mismatch parameter Δ) is investigated. To this end, a single soliton spectrum is generated, and the pulse repetition rate is varied around a central frequency of 9.77 GHz. The soliton pulse repetition rate follows adiabatically (i.e. without the loss of the soliton state) over a frequency interval spanning 60 kHz (FIG. 4B, right). It is interesting to compare this tolerance interval to the change of the FSR occurring when the resonator's temperature increases due to laser induced heating. A direct measure of this heating effect is the resonance frequency shift of approximately 10-100 MHz, occurring when the pulsed laser is tuned into soliton operation (FIG. 4C). This corresponds to a change of the FSR of a few kilohertz, which is much smaller than the tolerated frequency mismatch. This explains the robust operation of the resonator under pulsed pumping, even when the resonator is not actively stabilized. Hence, the discovered locking mechanism enables full, all optical control of the ultra-short solitons pulse repetition rate, as well as its carrier envelope offset frequency and without actuation on the resonator.

Preferably, one single soliton is created per input as observed with the single step features in the transmission. This is enables deterministic and reliable generation of single DKS states, which is challenging to achieve in conventional cw driven systems, yet highly desirable as the resulting optical spectrum is characterized by a smooth, unmodulated sech2 envelope (FIG. 4A). However, via (de-) tuning e.g. the frequency mismatch parameter Δ (or other driving pulse parameters) the input pump pulses 2 can be arranged to also deterministically result in multi-soliton states evidenced by higher 'step' height (FIG. 4C).

The corresponding optical spectra are characterized by a modulated envelope as shown in FIG. 4D, where the spectral modulation corresponds to the inverse separation of the soliton pulses in time. The transmission for a laser scan generating multiple solitons is shown in FIG. 4D. Similar to the single soliton case the resulting cumulative resonance shape does not show qualitative fluctuations between consecutive scans. Remarkably, identical soliton multi-soliton states can be reproduced by using identical driving pulse parameters (i. e. the exact optical spectrum is reproduced when the soliton is destroyed and regenerated with the same driving parameters). The stability of the spectral envelope of multi-soliton states over long time scales (>30 mins) also agrees well with the solitons being not only loosely attached to but indeed tightly locked to a specific relative temporal position of the driving pulse.

The ultra-low power soliton generation of the invention can be demonstrated by comparing the efficiency of a resonator device driven by optical input pulses when compared to continuous wave driven resonators. To this end a resonator with a resonance width of 2.5 MHz and 9.80 GHz FSR is used. The coupling of the resonator is strongly under-coupled and reaches only 0.5%. Further optimization of the sample fabrication process can however yield critically coupled resonators with comparable linewidth. Single soliton generation is possible already when driving the resonator with 2.1 ps pulses and 3 mW of maximally coupled average power corresponding to pulse energies of approximately 300 fJ. The required average power is below the parametric threshold power in cw driving and even below the (thermal and nonlinear) bistability threshold. Interestingly, the pulsed driving allows to directly enter the single soliton state, without transiting through an intermediate state of breather solitons (no noise present in the transmission trace). This test result is confirmed by numerical simulations by the inventors. Further numerical simulations confirm that the required power for equivalent single soliton generation scales approximately with the number of in-phase driving modes (i.e. with the duty cycle of the driving pulse train). Generally, high average driving power and shorter driving pulse duration, but also lower anomalous GVD results in broader spectra.

In summary, the inventors have found for the first time that a nonlinear optical resonator being driven by periodic optical pico-second pulses, whose corresponding optical modes are matched to the modes of the resonator, allow the formation of femtosecond DKS 'on-top' of the resonantly enhanced external driving input pulses. Surprisingly, DKS formation does not require the external pulse repetition rate to exactly match the FSR of the resonator (or the corresponding natural soliton pulse repetition rate). Instead, the repetition rate of the external laser can even be tuned around this value without destroying the generated soliton circulating inside the resonator.

The tests by the inventors reveal that indeed, the soliton stays tightly locked to the driving pump pulses and even adapts adiabatically to the externally imposed pulse repetition rate. This remarkable behavior is in agreement with numerical simulations that reveal the underlying plasticity of the soliton that via shifts and deformation of its spectral envelope can adapt to the externally imposed pulse repetition rate. Moreover, the inventions demonstrates that pulsed pumping can significantly lower the average threshold power of DKS formation to below the parametric threshold power (and even the bistability power) of cw driven systems. An advantageous side effect of the highly efficient and 'targeted' pulse pumping is that, in contrast to conventional cw driven systems, the laser can be manually (i.e. slowly) tuned into the soliton state, without the need for rapid and complex actuation on the driving laser or the resonator.

The features of the invention disclosed in the above description, the drawings and the claims can be of significance both individually as well as in combination or subcombination for the realization of the invention in its various embodiments.

The invention claimed is:
1. Laser source apparatus, being configured for generating temporal dissipative cavity solitons, comprising:
   an input source device, being configured for providing an input light field, and
   an optical resonator device with a resonator having a third order optical Kerr non-linearity and being coupled with the input source device for generating the cavity solitons by the driving input light field, wherein
   the resonator includes an optical micro-resonator,
   the input source device is configured for providing the input light field as a periodic pulse train of laser pulses being temporally separated from each other by a finite interval, and
   the resonator being arranged without an actuator for locking the cavity solitons to the driving input light field of the periodic pulse train of laser pulses.
2. Laser source apparatus according to claim 1, wherein the input source device is configured for providing the pulse train with the duty cycle equal to or below ⅕.
3. Laser source apparatus according to claim 1, wherein the input source device is controllable in pulse duration such that one single cavity soliton is created per input laser pulse.
4. Laser source apparatus according to claim 1, wherein the input source device is controllable in pulse duration such that more than one cavity soliton is created per input laser pulse.
5. Laser source apparatus according to claim 1, further including
   a sensor device, being arranged for sensing parameters of at least one of the input light field and the cavity solitons.
6. Laser source apparatus according to claim 1, further comprising at least one of:
   the input source device being controllable in pulse repetition rate and carrier envelope offset frequency, such that the optical modes of the laser pulses are adapted to resonant modes of the resonator, and
   the resonator being controllable in resonance frequencies, such that the optical modes of the laser pulses are adapted to resonant modes of the resonator.
7. Laser source apparatus according to claim 6, wherein at least one of the input source device and the resonator is controllable such that the pulse repetition rate of the input laser pulses and the free spectral range of the resonator are adapted relative to each other and the carrier envelope offset frequency of the input laser pulses and the resonance frequencies of the resonator are adapted relative to each other.
8. Laser source apparatus according to claim 6, wherein at least one of the input source device and the resonator is controllable in pulse repetition rate such that the pulse repetition rate is an integer fraction or an integer multiple of the free-spectral range of the resonator.
9. Laser source apparatus according to claim 6, further including
   an input control device, being configured for controlling at least one of the pulse repetition rate and the carrier envelope offset frequency of the input source device.

10. Laser source apparatus according to claim 9, further including
a control loop including a sensor device, being arranged for sensing parameters of at least one of the input light field and the cavity solitons, and the input control device, wherein
the input control device is configured for acting on the input source device in dependency on the sensed parameters.

11. Laser source apparatus according to claim 6, further including
a resonator control device, being configured for acting on the resonator for adapting resonance frequencies of the resonator to at least one of the pulse repetition rate and the carrier envelope offset frequency of the input source device.

12. Laser source apparatus according to claim 1, wherein the input source device has at least one of:
the input source device is adapted for providing the pulse train of laser pulses with a duration from 10 fs to 100 ps,
the input source device is adapted for providing the pulse train of laser pulses with a repetition rate from 10 MHz to 100 GHz,
the input source device is adapted for providing the laser pulses with a frequency chirp, and
the input source device includes one of a tunable electro-optic modulator-based pulse generator, a mode-locked laser, an amplitude modulated cw laser source and a phase-modulated cw laser source.

13. Laser source apparatus according to claim 1, wherein the resonator has at least one of:
the resonator includes a Fabry-Perot cavity,
the resonator includes a ferrule contained coated optical fiber,
the resonator includes a waveguide,
the resonator is made of SiN, AlN, GaN, $SiO_2$, or chalcogenide glass, and
the resonator is made of crystalline optical material, in particular $CaF_2$, $MgF_2$, $BaF_2$, diamond, $LiNbO_3$, $KNbO_3$, silicon, gallium arsenide, or indium phosphide.

14. Laser source apparatus according to claim 1, wherein a serial cascade arrangement of multiple laser source apparatuses is provided, wherein one of the laser source apparatuses is arranged as the input source device of a subsequent one of the laser source apparatuses.

15. Method of generating temporal dissipative cavity solitons, comprising:
providing an input light field with an input source device, and
generating the cavity solitons by the driving input light field with a resonator device including a resonator having a third order optical Kerr non-linearity and being coupled with the input source device, wherein
the resonator comprises an optical micro-resonator,
the input source device provides the input light field as a periodic pulse train of laser pulses being temporally separated from each other by a finite interval, and
the resonator is arranged without an actuator for locking the cavity solitons to the driving input light field of the periodic pulse train of laser pulses.

16. Method according to claim 15, wherein
the resonator device includes an optical micro-resonator having the third order optical Kerr non-linearty and being coupled with the input source device, the input source device includes an amplitude modulated cw laser source or a phase-modulated cw laser source, and
the method further includes sensing parameters of the cavity solitons, wherein firstly the pulse repetition rate is adapted to the free-spectral range of the resonator, an integer fraction of the free-spectral range or an integer multiple of the free-spectral range, the carrier envelope offset frequency of the pulse train is subsequently scanned such that the optical modes of the pulse train scan over resonance frequencies of the micro-resonator, and the scanning of the pulse train's carrier envelope offset frequency is stopped once the soliton state has been achieved.

17. Method according to claim 16, including
controlling the pulse duration of the input laser pulses such that one single cavity soliton is created per input laser pulse.

18. Method claim according to claim 15, wherein
the input source device provides the pulse train with the duty cycle equal to or below ⅕.

19. Method according to claim 15, including
controlling the pulse duration of the input laser pulses such that more than one cavity soliton is created per input laser pulse.

20. Method according to claim 15, including
sensing parameters of at least one of the input light field and the cavity solitons.

21. Method according to claim 15, including
controlling at least one of the pulse repetition rate and the carrier envelope offset frequency of the input laser pulses such that the optical modes of the laser pulses are adapted to resonant modes of the resonator.

22. Method according to claim 21, wherein
the pulse repetition rate of the input laser pulses and the free spectral range of the resonator are adapted relative to each other, and the carrier envelope offset frequency of the input laser pulses and one of the resonance frequencies of the resonator are adapted relative to each other.

23. Method according to claim 22, wherein
the pulse repetition rate is controlled such that the pulse repetition rate is an integer fraction or an integer multiple of the free-spectral range of the resonator.

24. Method according to claim 15, including
controlling the resonator for adapting resonance frequencies of the resonator to at least one of the pulse repetition rate and the carrier envelope offset frequency of the input source device.

25. Method according to claim 15, wherein the input laser pulses have at least one of:
the laser pulses have a duration from 10 fs to 100 ps,
the laser pulses have a repetition rate from 10 MHz to 100 GHz,
the laser pulses have a frequency chirp, and
the laser pulses are created with one of a tunable electro-optic modulator-based pulse generator, a mode-locked laser, an amplitude modulated cw laser source and a phase-modulated cw laser source.

26. Method according to claim 15, wherein the resonator has at least one of:
the resonator includes a Fabry-Perot cavity,
the resonator includes a ferrule contained coated optical fiber,
the resonator includes a waveguide,
the resonator is made of SiN, AlN, GaN, $SiO_2$, or chalcogenide glass, and the resonator is made of crystalline optical material, in particular $CaF_2$, $MgF_2$, $BaF_2$, diamond, $LiNbO_3$, $KNbO_3$, silicon, gallium arsenide, indium phosphide.

27. Method according to claim 15, wherein
a serial cascade arrangement of multiple laser source apparatuses is provided, wherein one of the laser source apparatuses is arranged as the input source device of a subsequent one of the laser source apparatuses.

28. Laser source apparatus, being configured for generating temporal dissipative cavity solitons, comprising:
an input source device, being configured for providing an input light field as a periodic pulse train of laser pulses being temporally separated from each other by a finite interval, the input source device including an amplitude modulated cw laser source or a phase-modulated cw laser source;
an optical resonator device including an optical microresonator having a third order optical Kerr non-linearity and being coupled with the input source device for generating the cavity solitons by the driving input light field,
the input source device being controllable in a pulse repetition rate and a carrier envelope offset frequency, such that the optical modes of the laser pulses are adapted to resonant modes of the resonator;
an input control device provided for controlling the pulse repetition rate and the carrier envelope offset frequency of the input source device; and
a sensor device arranged for sensing parameters of the cavity solitons and for monitoring a state of soliton generation.

* * * * *